United States Patent
Ashimoto et al.

(10) Patent No.: US 8,523,551 B2
(45) Date of Patent: Sep. 3, 2013

(54) UNVULCANIZED RUBBER EXTRUDER AND PROCESS FOR PRODUCING UNVULCANIZED RUBBER

(75) Inventors: Norimi Ashimoto, Kodaira (JP); Takeshi Masuda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 801 days.

(21) Appl. No.: 12/593,255

(22) PCT Filed: Mar. 26, 2008

(86) PCT No.: PCT/JP2008/055714
§ 371 (c)(1), (2), (4) Date: Mar. 1, 2010

(87) PCT Pub. No.: WO2008/117823
PCT Pub. Date: Oct. 2, 2008

(65) Prior Publication Data
US 2010/0140832 A1 Jun. 10, 2010

(30) Foreign Application Priority Data
Mar. 27, 2007 (JP) .................. 2007-082214

(51) Int. Cl.
*B29C 47/00* (2006.01)
*B32B 25/00* (2006.01)

(52) U.S. Cl.
USPC .......... 425/131.1; 425/133.5; 425/192 R; 425/462; 264/173.12; 264/173.16; 264/173.17; 264/174.11; 264/177.16; 156/244.11; 156/244.12; 152/209.5; 152/209.8

(58) Field of Classification Search
None
See application file for complete search history.

(56) References Cited

U.S. PATENT DOCUMENTS

| | | | | |
|---|---|---|---|---|
| 4,336,012 A | * | 6/1982 | Koch et al. | 425/131.1 |
| 4,526,528 A | * | 7/1985 | Kline et al. | 425/133.5 |
| 4,539,169 A | * | 9/1985 | Nixon et al. | 264/173.1 |
| 4,556,376 A | * | 12/1985 | Sievers et al. | 425/133.5 |

(Continued)

FOREIGN PATENT DOCUMENTS

| | | |
|---|---|---|
| EP | 0 131 122 A2 | 5/1984 |
| EP | 0 201 337 A2 | 5/1986 |

(Continued)

OTHER PUBLICATIONS

International Search Report of PCT/JP2008/055714 dated May 13, 2008.

(Continued)

*Primary Examiner* — Jeffrey Wollschlager
(74) *Attorney, Agent, or Firm* — Sughrue Mion, PLLC

(57) ABSTRACT

An unvulcanized rubber extruder that realizes extrusion forming of an unvulcanized rubber extrudate ensuring manufacturing of a high-quality tire without any increase of tire manufacturing steps. In the vicinity of left side end portion, in the drawing, of unvulcanized rubber (A) (rubber chafer part), unvulcanized rubber (B) flows along parallel wall (56) on the downside of main rubber flow channel (34) and flows along second inclined surface (38) on the upside of the main rubber flow channel (34). Simultaneously, apart from the main flow of the unvulcanized rubber (B), portion of the unvulcanized rubber (B) is extruded out in the direction perpendicular to auxiliary rubber flow channel (44) (arrow B direction). Accordingly, in the left side end portion, in the drawing, of unvulcanized rubber (A) (rubber chafer part), it appears that the upside and downside are shut in by the flow of the unvulcanized rubber (B).

2 Claims, 12 Drawing Sheets

(56) References Cited

U.S. PATENT DOCUMENTS

| | | | | |
|---|---|---|---|---|
| 4,556,382 A | * | 12/1985 | Nadeau et al. | 425/462 |
| 4,683,095 A | * | 7/1987 | Tolonen et al. | 264/173.12 |
| 4,731,004 A | * | 3/1988 | Wenz, Jr. | 425/133.5 |
| 5,017,118 A | * | 5/1991 | Looman et al. | 425/133.5 |
| 5,397,616 A | * | 3/1995 | Aoki | 428/33 |
| 5,928,679 A | * | 7/1999 | Ohki et al. | 425/327 |
| 6,294,119 B1 | * | 9/2001 | Nakamura | 264/173.12 |
| 6,336,486 B1 | * | 1/2002 | Iwasaki et al. | 152/209.4 |
| 6,495,081 B2 | * | 12/2002 | Benatti | 264/173.17 |
| 6,866,494 B2 | * | 3/2005 | Tomlinson | 425/131.1 |
| 7,258,827 B2 | * | 8/2007 | Shimada | 264/173.12 |
| 2002/0125608 A1 | * | 9/2002 | Shimada | 264/174.11 |
| 2002/0157747 A1 | * | 10/2002 | Shimada et al. | 152/209.5 |
| 2004/0108621 A1 | * | 6/2004 | Kegasawa et al. | 264/171.1 |
| 2005/0121823 A1 | * | 6/2005 | Shimada | 264/174.11 |
| 2006/0157177 A1 | * | 7/2006 | Shimada et al. | 152/209.5 |
| 2007/0262484 A1 | * | 11/2007 | Fujii et al. | 264/173.12 |

FOREIGN PATENT DOCUMENTS

| | | |
|---|---|---|
| EP | 1 240 994 A1 | 9/2002 |
| JP | 10-166416 A | 6/1998 |
| JP | 11-240081 A | 9/1999 |
| JP | 2000-117813 A | 4/2000 |
| JP | 2002-264196 A | 9/2002 |

OTHER PUBLICATIONS

Extended European Search Report dated Nov. 6, 2012 issued in European Patent Application No. 08738902.9.

* cited by examiner

FIG.2
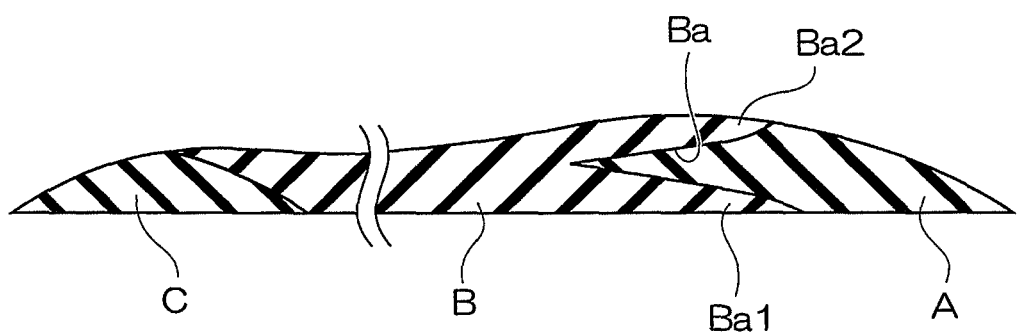

UNVULCANIZED RUBBER EXTRUDER AND PROCESS FOR PRODUCING UNVULCANIZED RUBBER

CROSS REFERENCE TO RELATED APPLICATIONS

This application is a National Stage of International Application No. PCT/JP2008/055714 filed Mar. 26, 2008, claiming priority based on Japanese Patent Application No. 2007-082214 filed Mar. 27, 2007, the contents of all of which are incorporated herein by reference in their entirety.

TECHNICAL FIELD

The present invention relates to an unvulcanized rubber extruder and a process for producing unvulcanized rubber that extrude an unvulcanized rubber member that is formed from at least two or more types of unvulcanized rubber.

BACKGROUND TECHNOLOGY

In pneumatic tires for automobiles, in order to increase the rigidity of the bead portion, there are cases in which a rubber chafer formed from a hard rubber is provided at the outer side portion of the bead portion. The upper end of this rubber chafer is connected to a sidewall rubber layer that forms the sidewall portion (refer to, for example, Patent Document 1). By the way, due to the bead portion repeatedly receiving bending deformation due to traveling, there are cases in which the rubber chafer and the sidewall rubber layer peel apart.

In order to overcome this problem, it has been thought to increase the joined surface area of the rubber chafer and the sidewall rubber layer, and a pneumatic tire having a cross-sectional shape such as shown in FIG. 11 has been proposed. In this pneumatic tire, as shown in FIG. 11, an inner side piece 106A, an outer side piece 106B, that are provided at the radial direction inner end portion of a sidewall rubber layer 106 structuring a sidewall 104, are structured so as to contact and cover the tire axial direction inner surface, outer surface, respectively, of a rubber chafer 102 whose upper portion is tapered, such that the joined surface area of the sidewall rubber layer 106 and the rubber chafer 102 is made large and the joining thereof is strengthened.

In order to produce such a pneumatic tire, in the green tire producing step, a rubber extruded member 108, that has a cross-sectional shape such as shown in FIG. 12 and integrates the sidewall rubber layer 106 that is unvulcanized and the rubber chafer 102 that is unvulcanized, is produced, and thereafter, a rubber sheet 110 formed from the same type of unvulcanized rubber as the sidewall rubber layer 106 is affixed so as to cover a vicinity of the rubber chafer 102 end portion of the rubber extruded member 108.

Then, the rubber extruded member 108, to which this rubber sheet 110 is affixed, is affixed to the carcass outer side surface of the tire case that is undergoing production, and the pneumatic tire was produced.

Patent Document 1: Japanese Patent Application Laid-Open No. 10-166416

DISCLOSURE OF THE INVENTION

Problems to be Solved by the Invention

However, in the conventional example, there are problems such as the following.

(1) The rubber sheet 110 as a separate member is needed, and equipment that produces the rubber sheet 110 is needed.
(2) The step of adhering the rubber sheet 110 to the rubber extruded member 108 increases.
(3) By affixing the rubber sheet 110 that has thickness, as shown in FIG. 12, steps 112 arise at the surface of the rubber extruded member 108, and therefore, this is related to inferior manufactured products (the air at the step portions becomes a cause of bare portions, becomes a cause of creases, and the like).
(4) Accuracy of the affixing-together positions is required.

An object of the present invention is to provide an unvulcanized rubber extruder and a process for producing unvulcanized rubber that can extrusion-mold an unvulcanized rubber extruded member by which a high-quality tire can be obtained, without increasing the tire producing steps.

Means for Solving the Problems

The invention recited in aspect 1 is an unvulcanized rubber extruder having a first extruder main body that extrudes a first unvulcanized rubber, a second extruder main body that extrudes a second unvulcanized rubber, an extrusion head that connects a distal end portion of the first extruder main body and a distal end of the second extruder main body, and a flow path forming mold that leads the first unvulcanized rubber and the second unvulcanized rubber out toward a cap at an extrusion head distal end portion, the unvulcanized rubber extruder extrusion-molding an extruded rubber member having a cross-sectional shape in which, when viewed in a cross-section perpendicular to an extruding direction of the extruded rubber member, a portion of the second unvulcanized rubber penetrates into the first unvulcanized rubber, and a portion of the first unvulcanized rubber is disposed at both sides in a direction intersecting a penetrating direction of the second unvulcanized rubber that has penetrated, and the invention is structured such that the flow path forming mold has a first flow path that passes the first unvulcanized rubber toward the cap, a second flow path that is provided parallel to the first flow path and passes the second unvulcanized rubber toward the cap, and a third flow path that opens at a side wall of the second flow path and causes the first unvulcanized rubber to flow-out toward a side surface of the second unvulcanized rubber that passes through the second flow path, and the unvulcanized rubber extruder connects the first unvulcanized rubber, that has flowed-out from the third flow path, to a portion of the first vulcanized rubber that flows through the first flow path, and sandwiches-in a portion of the second unvulcanized rubber by a portion of the first unvulcanized rubber that flows through the first flow path and the first unvulcanized rubber that has flowed-out from the third flow path.

In the unvulcanized rubber extruder recited in aspect 1, at the first extruder main body, the first unvulcanized rubber is, and, at the second extruder main body, the second unvulcanized rubber is fed-out toward the flow path forming mold, respectively. Then, when the first unvulcanized rubber flows through the first flow path and the third flow path that are formed at the flow path forming mold and the second unvulcanized rubber flows through the second flow path that is formed at the flow path forming mold, the first unvulcanized rubber that flows-out from the third flow path connects with a portion of the first unvulcanized rubber that flows through the first flow path, and a portion of the second unvulcanized rubber is sandwiched-in by a portion of the first unvulcanized rubber that flows through the first flow path and the first unvulcanized rubber that has flowed-out from the third flow path, and an extruded rubber member having a cross-sectional shape in which, when viewed in a cross-section perpendicular to the extruding direction, a portion of the second unvulcanized rubber penetrates into the first unvulcanized rubber, and a portion of the first unvulcanized rubber is disposed at both sides in a direction intersecting a penetrating direction of the second unvulcanized rubber that has penetrated, is easily obtained in one extrusion step.

Further, because the first unvulcanized rubber flows-out from the third flow path toward the side surface of the second unvulcanized rubber, the first unvulcanized rubber from the third flow path can be adhered to the second unvulcanized rubber directly and reliably and in a sufficient amount (thickness when viewed in cross-section).

The invention recited in aspect 2 is structured such that, in the unvulcanized rubber extruder recited in claim 1, the third flow path causes the first unvulcanized rubber to flow-out in a direction perpendicular to the second flow path.

In the unvulcanized rubber extruder recited in aspect 2, when the direction of the first unvulcanized rubber that is made to flow-out from the third flow path approaches the flowing direction of the second unvulcanized rubber that flows through the second flow path, the adhered amount (thickness when viewed in cross-section) of the first unvulcanized rubber, that flows-out from the third flow path, with respect to the second unvulcanized rubber tends to decrease.

Accordingly, in order to most efficiently adhere the first unvulcanized rubber, that is made to flow-out from the third flow path, to the second unvulcanized rubber, it is preferable that the third flow path make the first unvulcanized rubber flow-out in a direction perpendicular to the second flow path.

The invention recited in aspect 3 is a process for producing unvulcanized rubber that, by using an extruder, extrusion-molds an extruded rubber member having a cross-sectional shape in which a portion of a second unvulcanized rubber penetrates into a first unvulcanized rubber, and a portion of the first unvulcanized rubber is disposed at both sides in a direction intersecting a penetrating direction of the second unvulcanized rubber that has penetrated, and the invention is structured to make the first unvulcanized rubber flow-out from a direction intersecting a flowing direction of the second unvulcanized rubber toward a side surface of the second unvulcanized rubber that flows toward a cap of the extruder, and connect the first unvulcanized rubber, that has flowed-out from the direction intersecting the flowing direction of the second unvulcanized rubber, to a portion of the first unvulcanized rubber that flows toward the cap, and sandwich-in a portion of the second unvulcanized rubber by a portion of the first unvulcanized rubber that flows toward the cap and the first unvulcanized rubber that has flowed-out from the direction intersecting the flowing direction of the second unvulcanized rubber.

In the process for producing unvulcanized rubber recited in aspect 3, when the first unvulcanized rubber flows-out from a direction intersecting the flowing direction of the second unvulcanized rubber toward the side surface of the second unvulcanized rubber that flows toward the cap of the extruder, the first unvulcanized rubber, that has flowed-out from the direction intersecting the flowing direction of the second unvulcanized rubber, connects with a portion of the first unvulcanized rubber that flows toward the cap, and a portion of the second unvulcanized rubber is sandwiched-in by a portion of the first unvulcanized rubber that flows toward the cap and the first unvulcanized rubber that has flowed-out from the direction intersecting the flowing direction of the second unvulcanized rubber, and an extruded rubber member having a cross-sectional shape in which, when viewed in a cross-section perpendicular to the extruding direction, a portion of the second unvulcanized rubber penetrates into the first unvulcanized rubber, and a portion of the first unvulcanized rubber is disposed at both sides in a direction intersecting a penetrating direction of the second unvulcanized rubber that has penetrated, is easily obtained in one extrusion step.

Effects of the Invention

As described above, the unvulcanized rubber extruder and the process for producing unvulcanized rubber of the present invention have the excellent effect that an unvulcanized rubber member, by which a high-quality tire can be obtained, can be efficiently produced without increasing the tire producing steps.

BRIEF DESCRIPTION OF THE DRAWINGS

FIG. 2 is a cross-sectional view of an unvulcanized rubber member that is extrusion-molded by the unvulcanized rubber extruder.

PREFERRED EMBODIMENTS FOR IMPLEMENTING THE INVENTION

An exemplary embodiment of the unvulcanized rubber extruder of the present invention will be described in accordance with the drawings.

Figure 1:
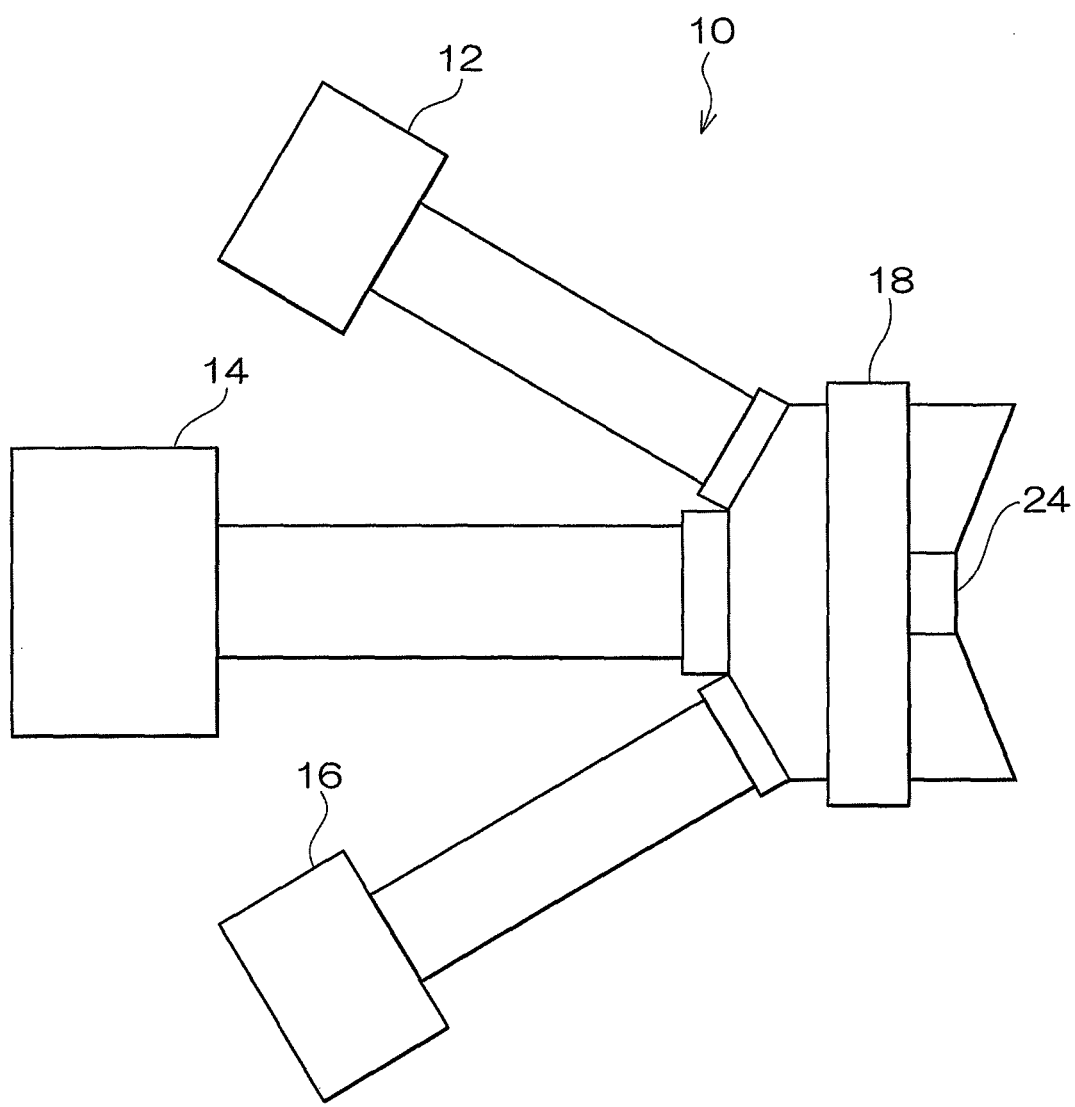
FIG. 1 is a side view showing the schematic structure of an unvulcanized rubber extruder.

As shown in FIG. 1, an unvulcanized rubber extruder 10 has three extruder main bodies 12, 14, 16, and an extrusion head 18 that is connected to the distal end portions of the extruder main bodies 12, 14, 16.

Note that each of the extruder main bodies 12, 14, 16 has a hopper (not illustrated) for the supply of unvulcanized rubber, and three types of unvulcanized rubbers A, B, C having mutually different compounding compositions are continuously supplied to the respective extruder main bodies 12, 14, 16 from the hoppers, and are kneaded by screws (not illustrated) that are driven to rotate within the respective extruder main bodies 12, 14, 16, and, while self-heat-generating such that the plasticities thereof decrease and the fluidities thereof increase, are led-out toward the extrusion head 18.

The structures of the respective extruder main bodies 12, 14, 16 are structures that are similar to conventional products.

Here, before the structure of the unvulcanized rubber extruder 10 is described in detail, an unvulcanized rubber member 19 that is extrusion-molded at the unvulcanized rubber extruder 10 will be described on the basis of FIG. 2. As shown in the cross-sectional view of FIG. 2, the unvulcanized rubber member 19 is structured from the three types of unvulcanized rubber that are the unvulcanized rubber A for forming a rubber chafer, the unvulcanized rubber B for forming a sidewall rubber layer, and the unvulcanized rubber C for forming a cushion rubber layer that is disposed at the inner side of a vicinity of the tire shoulder of the tread. The unvulcanized rubber member 19 is extrusion-molded at a wide width in the horizontal direction (the direction of arrow L and the direction of arrow R).

At the unvulcanized rubber member 19, a substantially V-shaped groove portion Ba is provided in the unvulcanized rubber B (sidewall rubber layer) at the one end portion at the arrow R direction side. At this one end portion, the lower side portion sandwiching the groove portion Ba is made to be an inner side piece Ba1 that runs along the outer side surface of the carcass of the produced tire, and the upper side portion sandwiching the groove portion Ba is made to be an outer side piece Ba2 that runs along the tire outer side wall surface. The inner side piece Ba1 and the outer side piece Ba2 both form tapered shapes whose thickness is reduced toward the end portion.

On the other hand, the unvulcanized rubber A (rubber chafer) extends in the transverse direction in the same way as the unvulcanized rubber B (sidewall rubber layer), and is formed in a tapered shape whose central portion is thick and both ends in the transverse direction have reduced thickness from the central portion.

Note that, at the unvulcanized rubber B (sidewall rubber layer) side of the unvulcanized rubber A (rubber chafer), the top surface contacts and is covered by the outer side piece Ba2, and the bottom surface contacts and is covered by the inner side piece Ba1.

The other end portion at the arrow L direction side of the unvulcanized rubber B (sidewall rubber layer) is formed in a tapered shape whose thickness is reduced toward the end portion. The unvulcanized rubber C (cushion rubber layer) is disposed at the arrow L direction side of the unvulcanized rubber B (sidewall rubber layer). Note that this rubber C is not absolutely necessary, depending on the tire.

The unvulcanized rubber C (cushion rubber layer) is formed in a tapered shape whose thickness is decreased toward the transverse direction both sides, and the one portion at the arrow R direction side is covered, from the upper side, by the other end portion of the unvulcanized rubber B (sidewall rubber layer).

Figure 3:
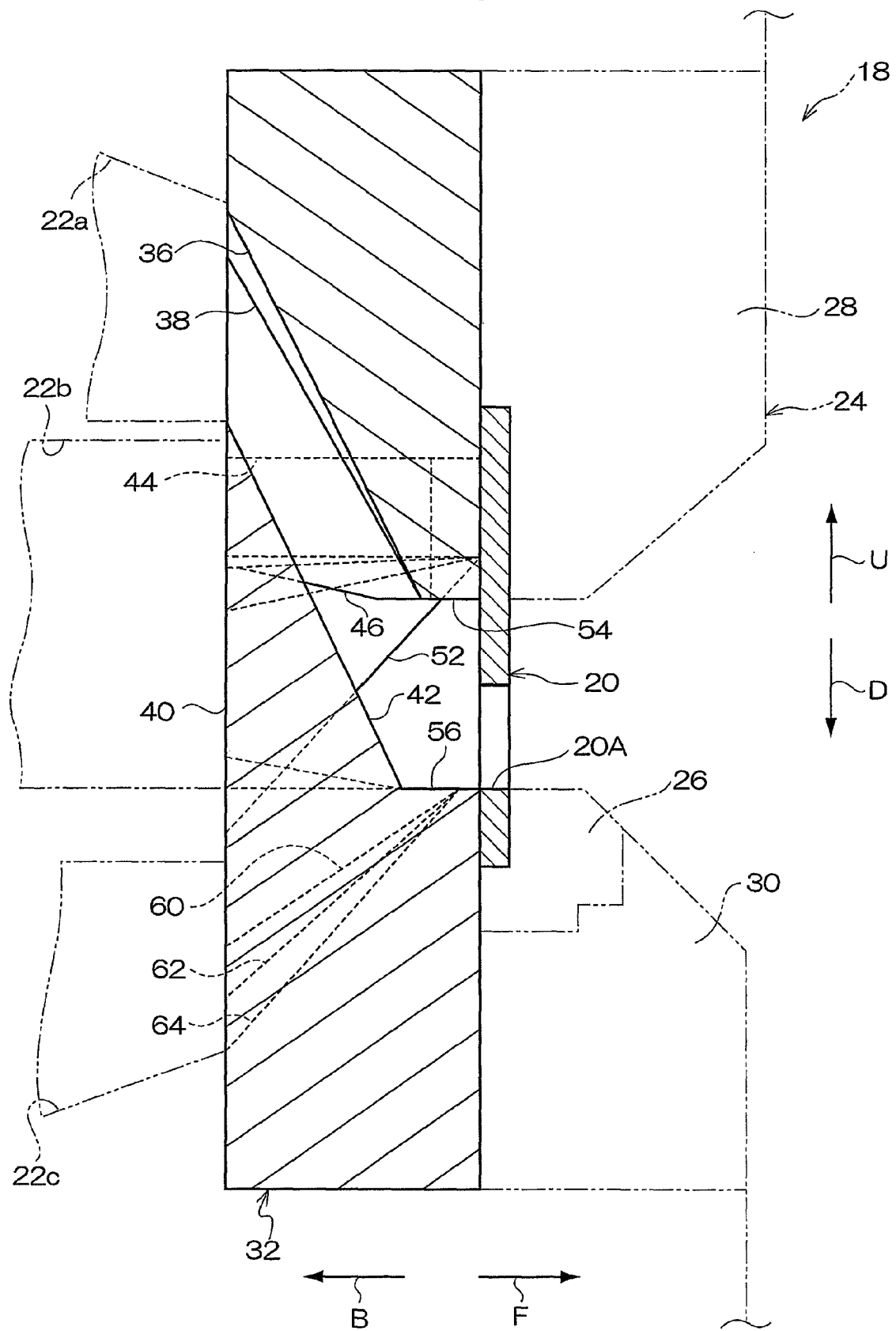
FIG. 3 is a longitudinal sectional view showing main portions of an extrusion head.

Next, the unvulcanized rubber extruder 10 will be described in detail. As shown in FIG. 3, the extrusion head 18 has an extrusion cap (hereinafter called cap) 20 that is positioned at the extruding direction front side of the unvulcanized rubbers A, B, C (not illustrated in FIG. 3), and has flow paths 22a, 22b, 22c of the unvulcanized rubbers A, B, C that are directed toward the cap 20 from the extrusion exits of the respective extruder main bodies 12, 14, 16 described above. The extrusion head 18 accommodates, between the final ends of the flow paths 22a, 22b, 22c and the front position of the cap 20, and so as to be freely removable, an unvulcanized rubber member forming means 24 that is for forming the unvulcanized rubber member 19 at which the unvulcanized rubbers A, B, C respectively have predetermined cross-sectional shapes.

Note that the unvulcanized rubber member 19 is extruded from the cap 20 in the arrow F direction of FIG. 3.

The unvulcanized rubber member forming means 24 has a back die 26 that forms a pair with the cap 20 and functions to separately form the bottom portion of an extrusion outer contour shape 20A of the cap 20, a die holder 28 that holds and fixes the cap 20 at the extrusion head 18, and a back die holder 30 that holds and fixes the back die 26 at the extrusion head 18.

Figure 4:
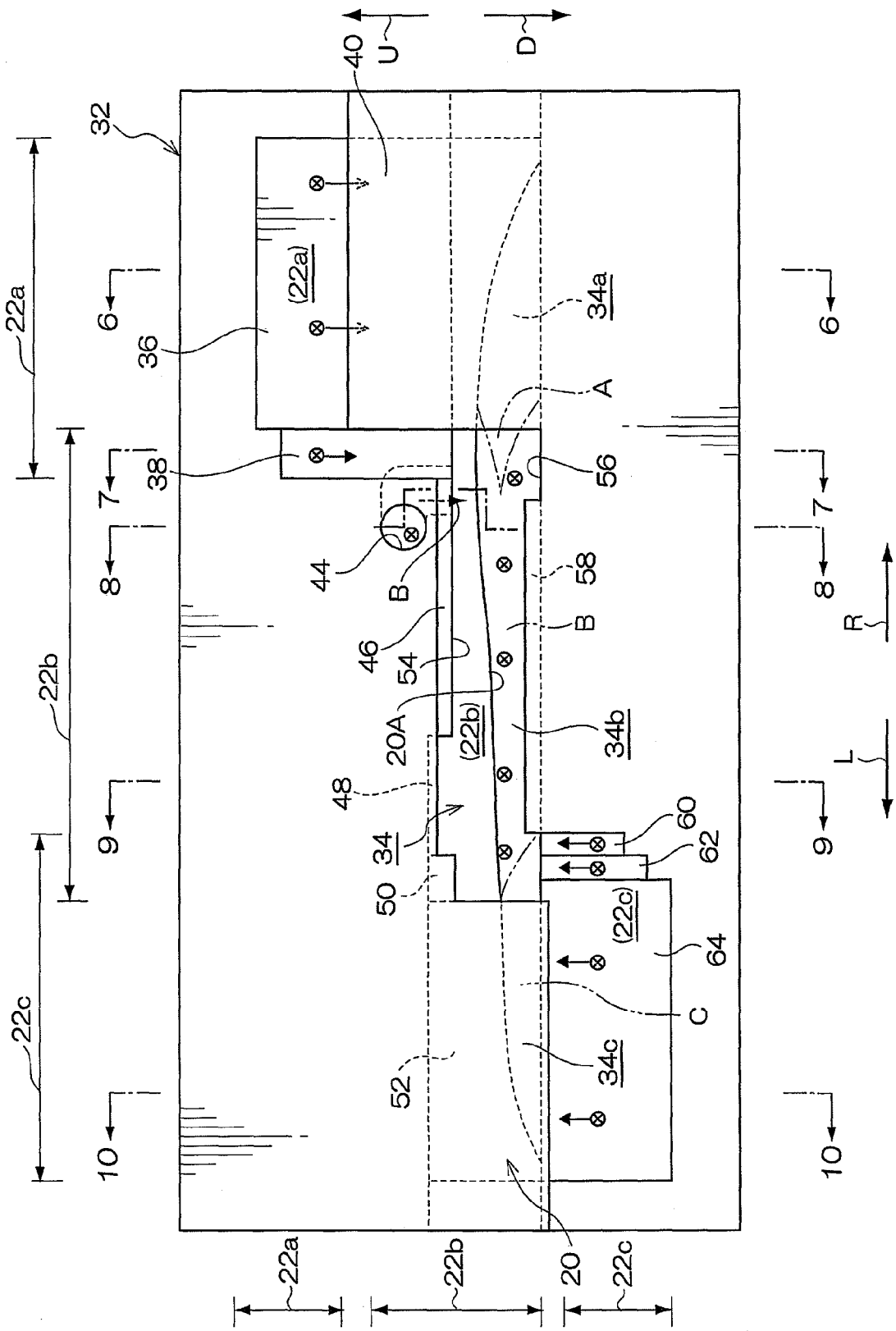
FIG. 4 is a front view of a flow path forming mold seen from an upstream side.

The unvulcanized rubber member forming means 24 has a flow path forming mold 32 between the final ends of the flow paths 22a, 22b, 22c of the extrusion head 18 and the cap 20. As shown in FIG. 4, the flow path forming mold 32 has a main rubber flow path 34 that is formed to be slender along a cross-sectional longitudinal direction of the unvulcanized rubber member 19. At the main rubber flow path 34, the right side in the drawing (the arrow R direction side) is a flow path 34a through which the unvulcanized rubber A flows, the center is a flow path 34b through which the unvulcanized rubber B flows, and the left side in the drawing (the arrow L direction side) is a flow path 34c through which the unvulcanized rubber C flows.

Figure 5:
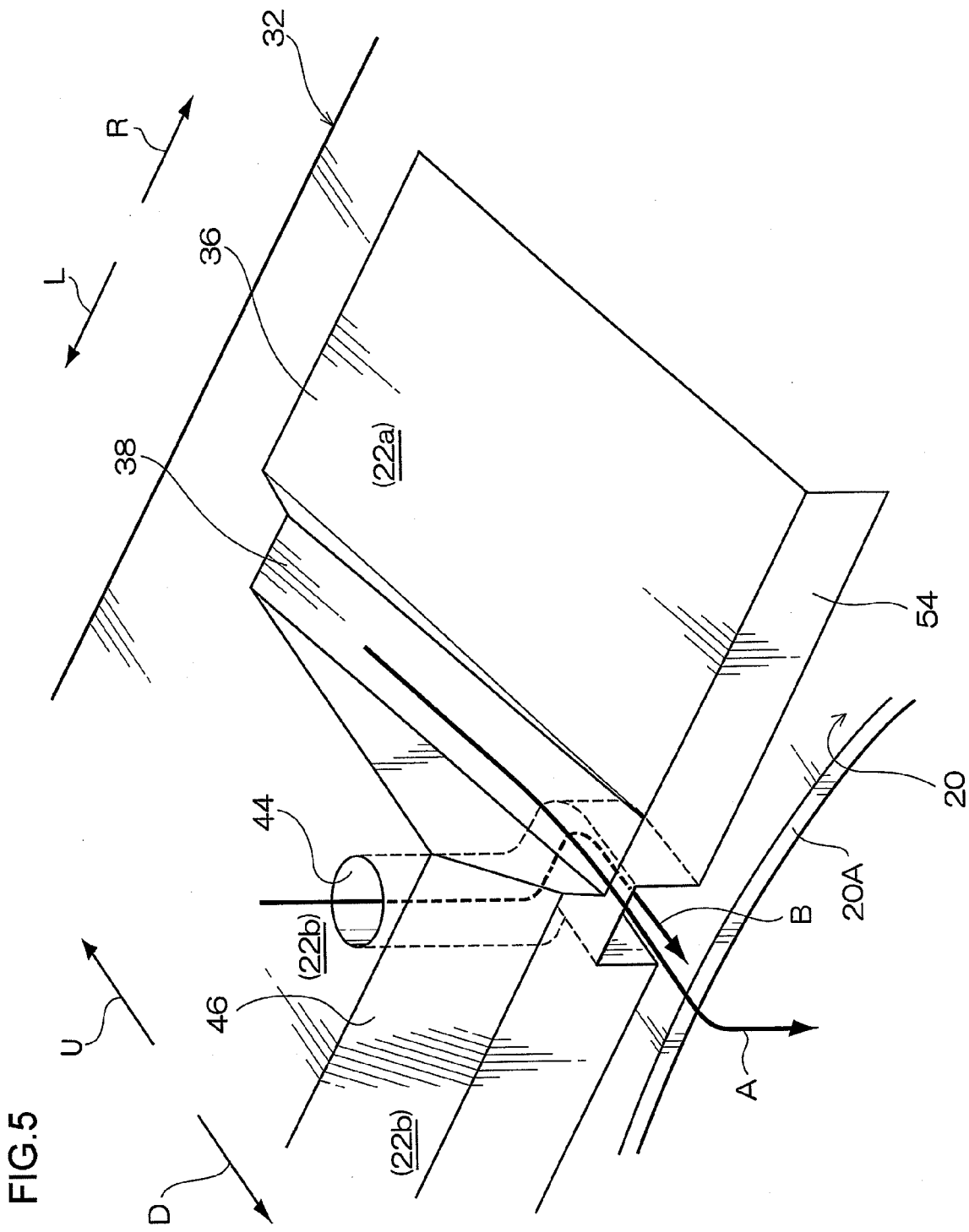
FIG. 5 is a perspective view showing a portion of the flow path forming mold.
Figure 6:
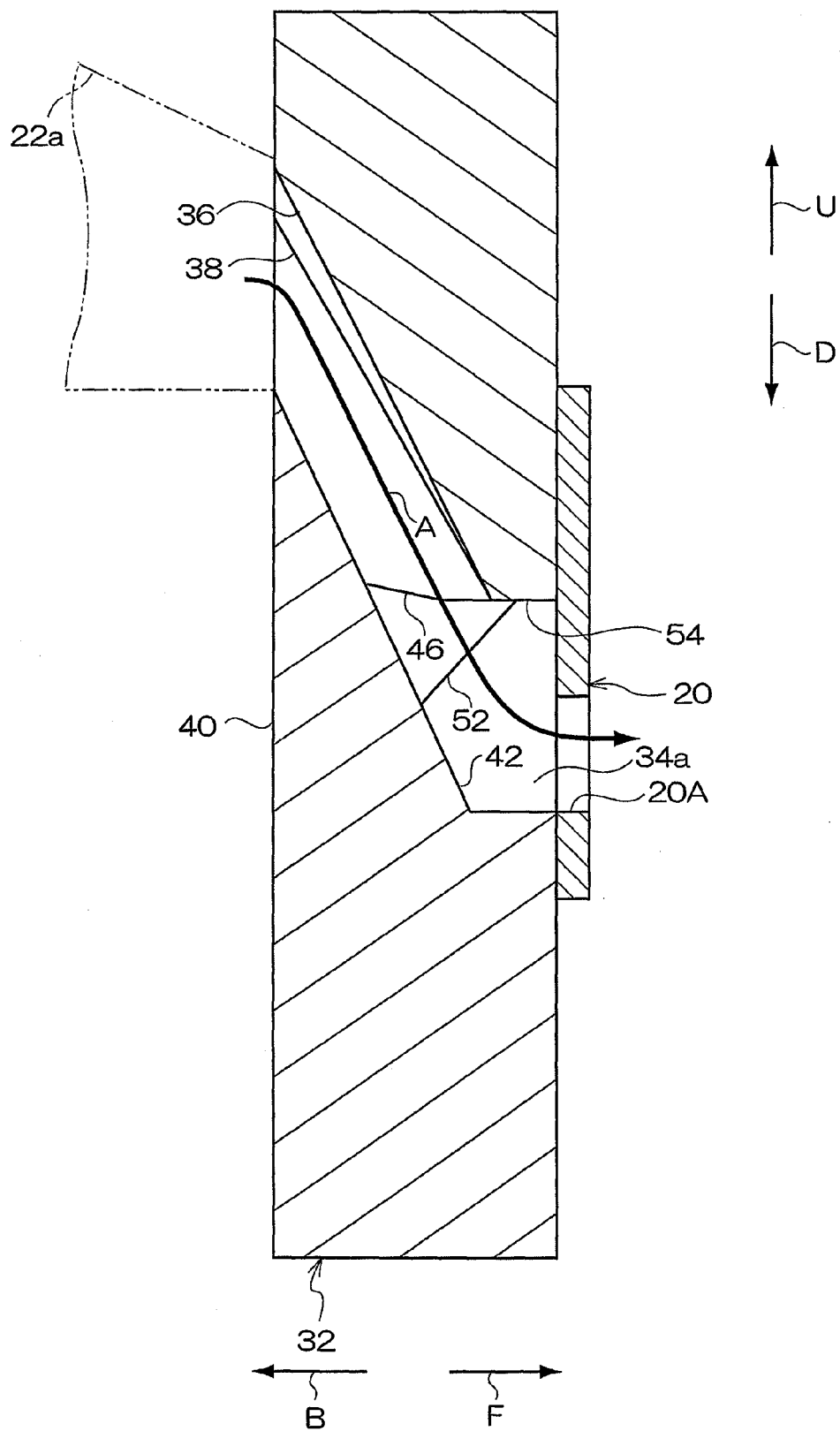
FIG. 6 is a cross-sectional view along line 6-6 of the flow path forming mold showing in FIG. 4.
Figure 7:
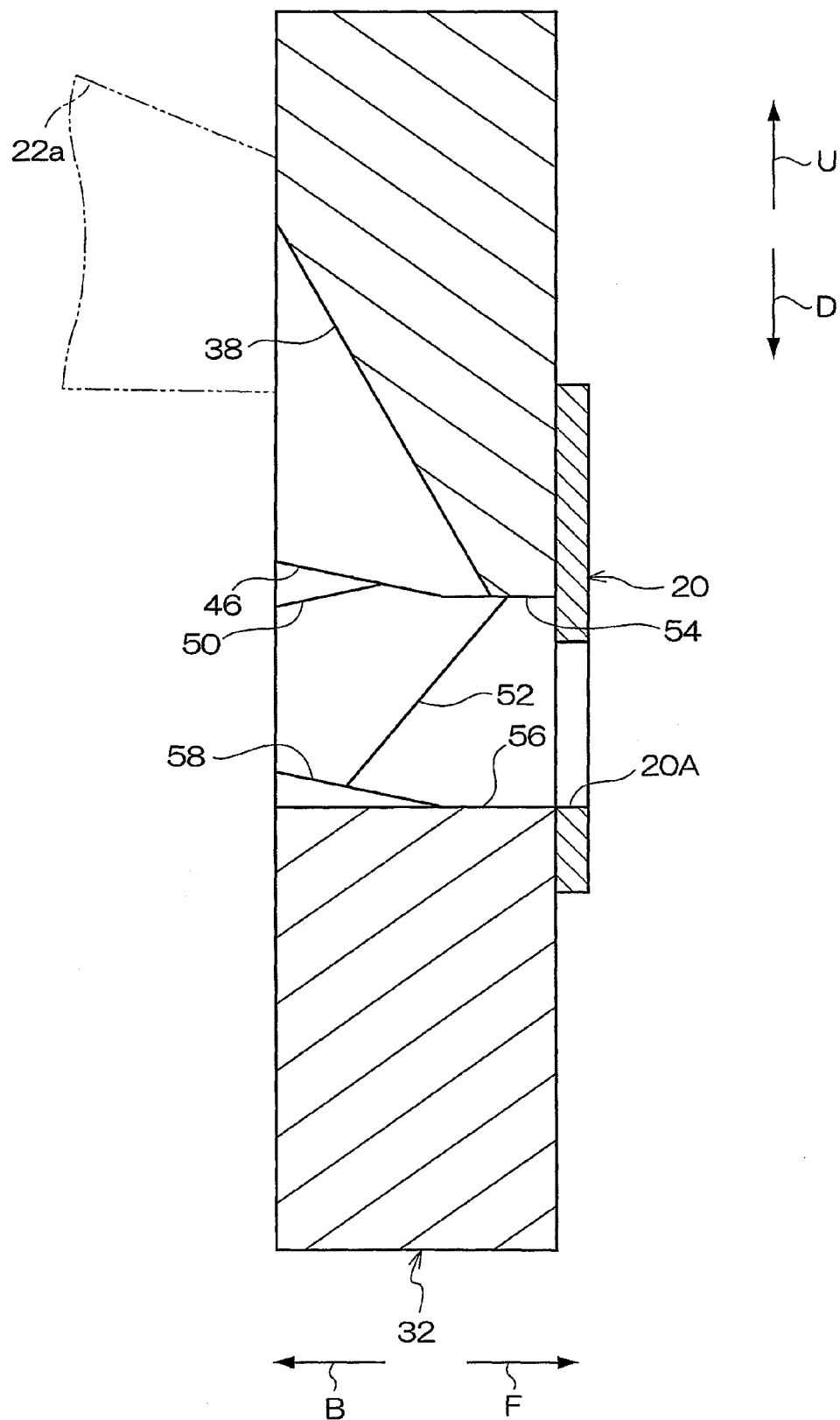
FIG. 7 is a cross-sectional view along line 7-7 of the flow path forming mold showing in FIG. 4.
Figure 8:
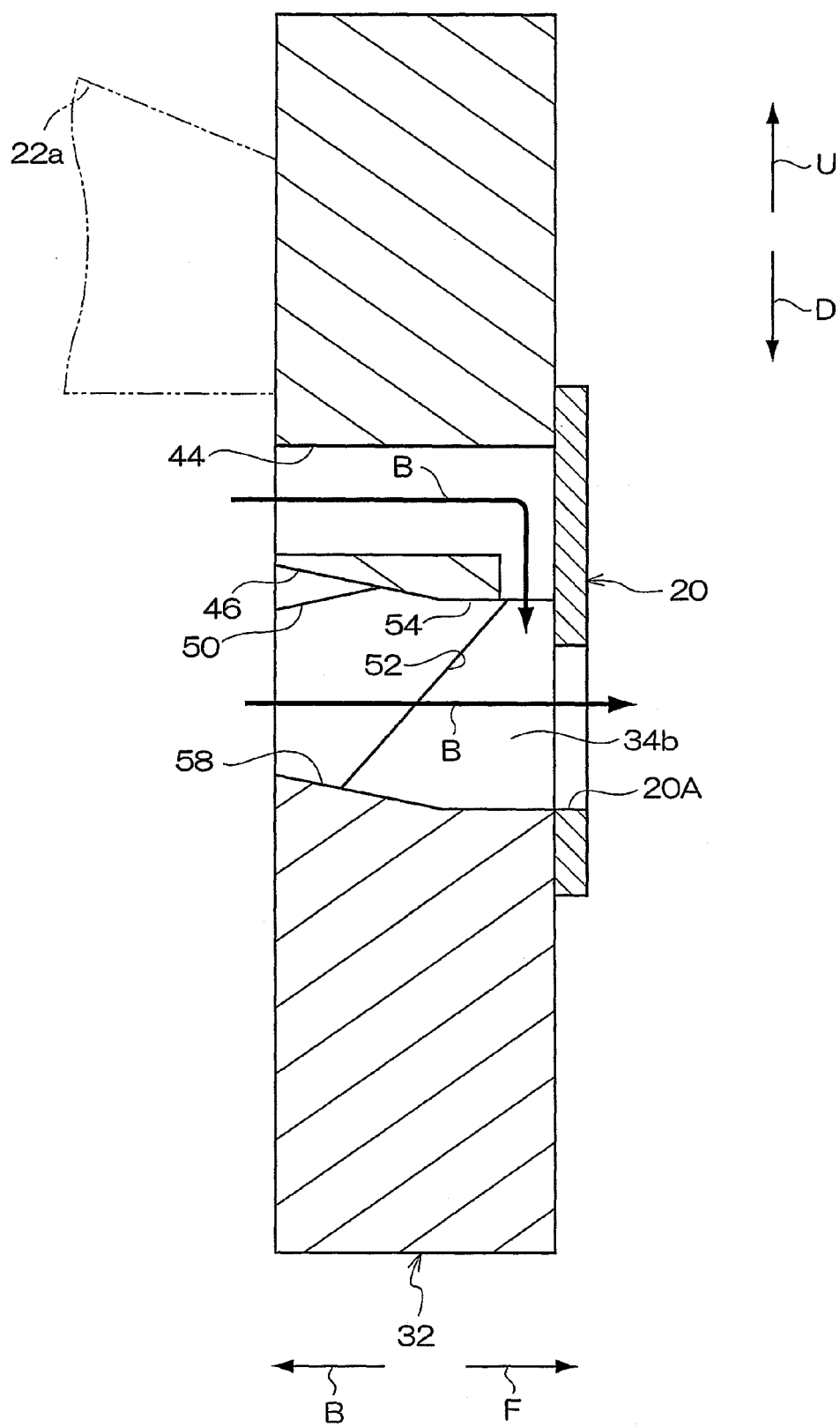
FIG. 8 is a cross-sectional view along line 8-8 of the flow path forming mold showing in FIG. 4.
Figure 9:
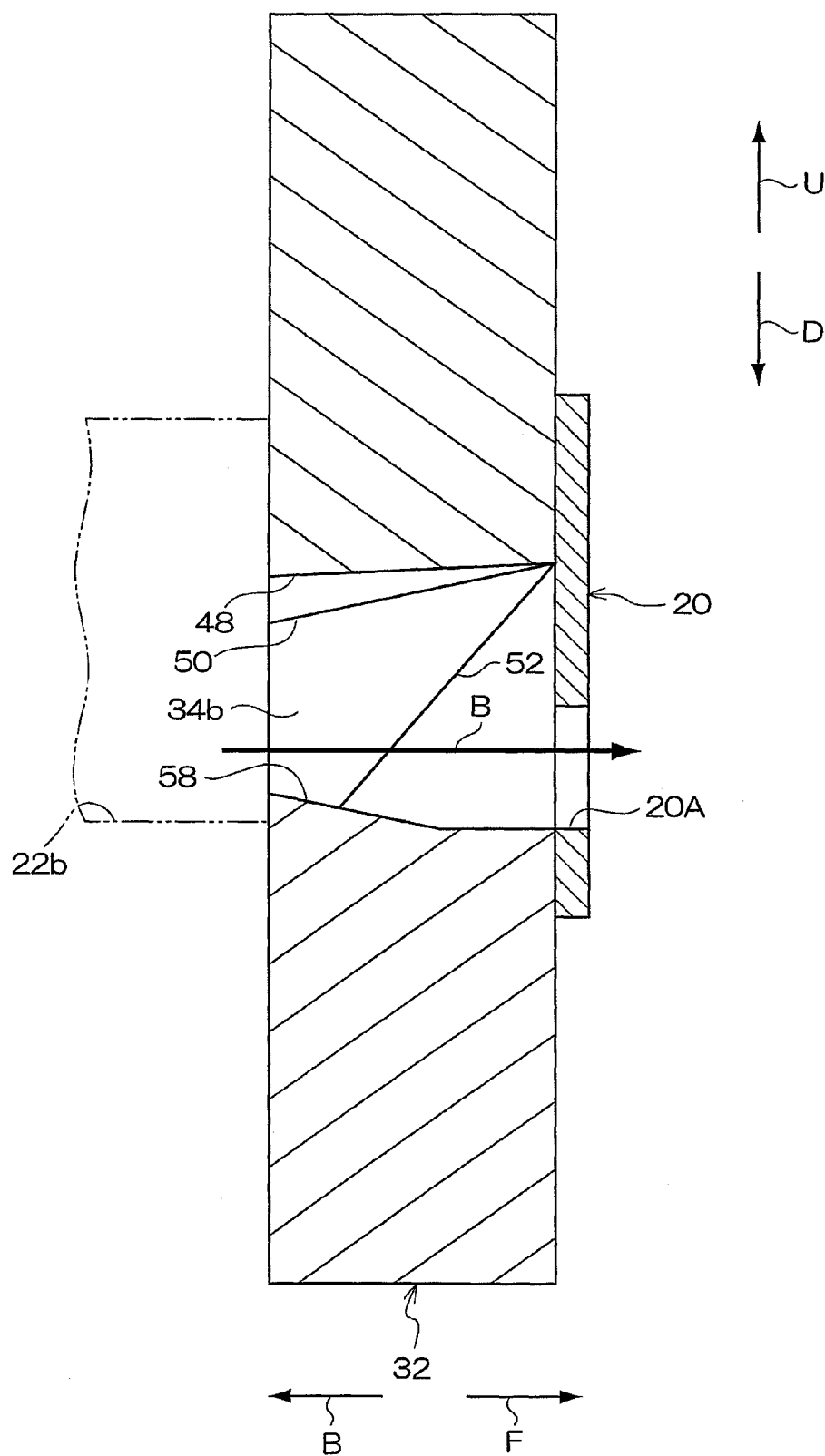
FIG. 9 is a cross-sectional view along line 9-9 of the flow path forming mold showing in FIG. 4.
Figure 10:
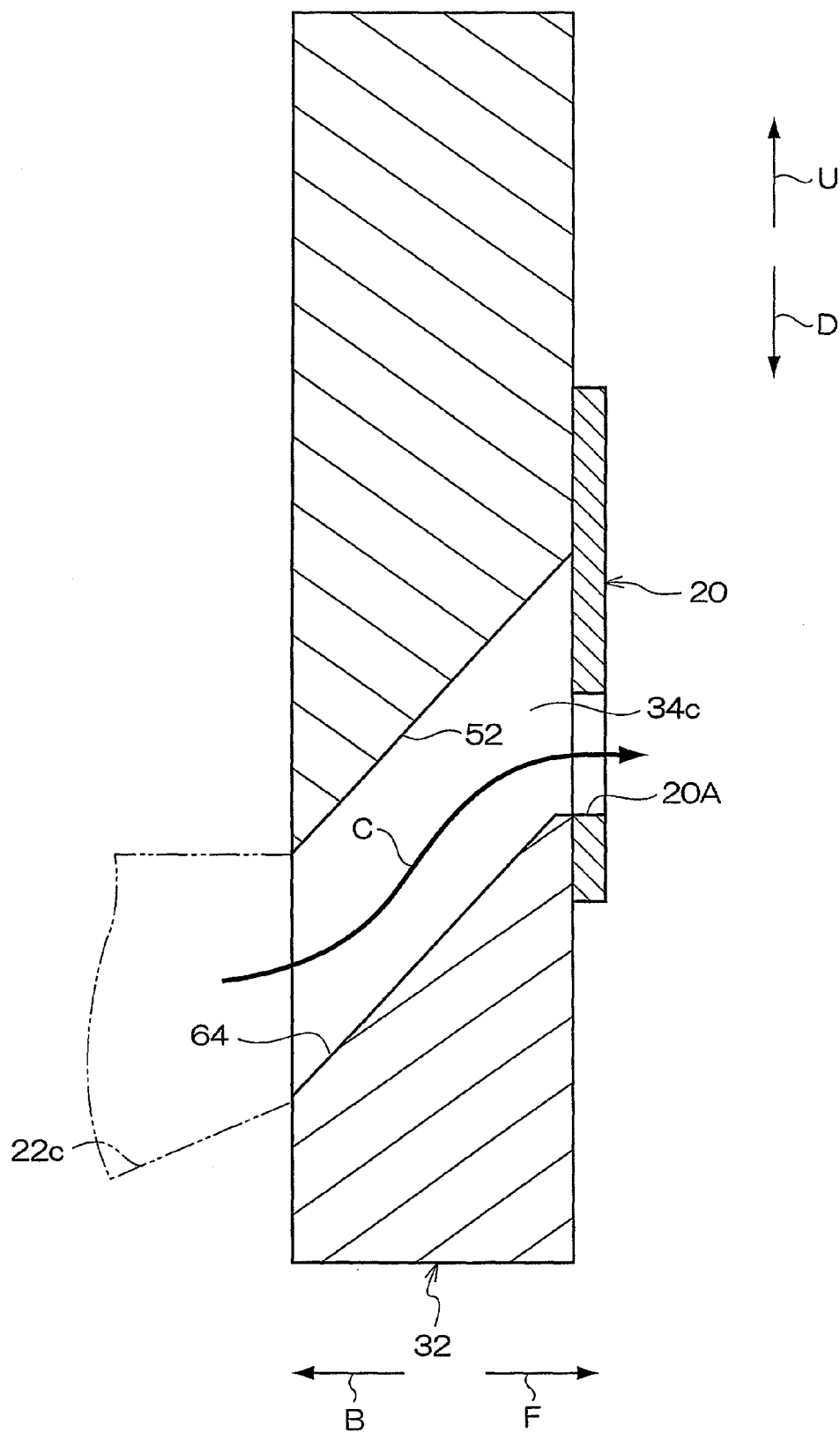
FIG. 10 is a cross-sectional view along line 10-10 of the flow path forming mold showing in FIG. 4.
Figure 11:
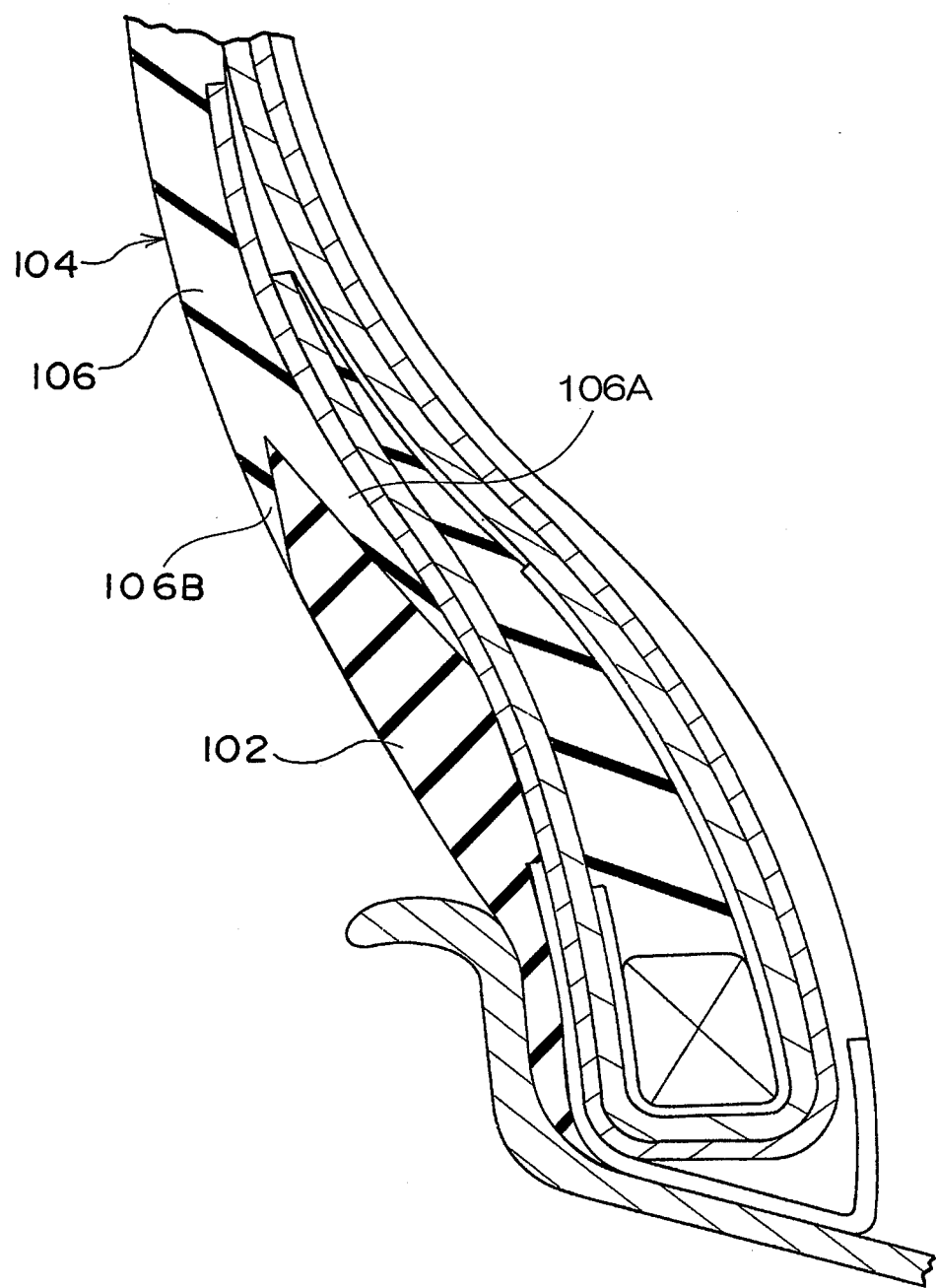
FIG. 11 is a cross-sectional view of a bead portion of a pneumatic tire.
Figure 12:
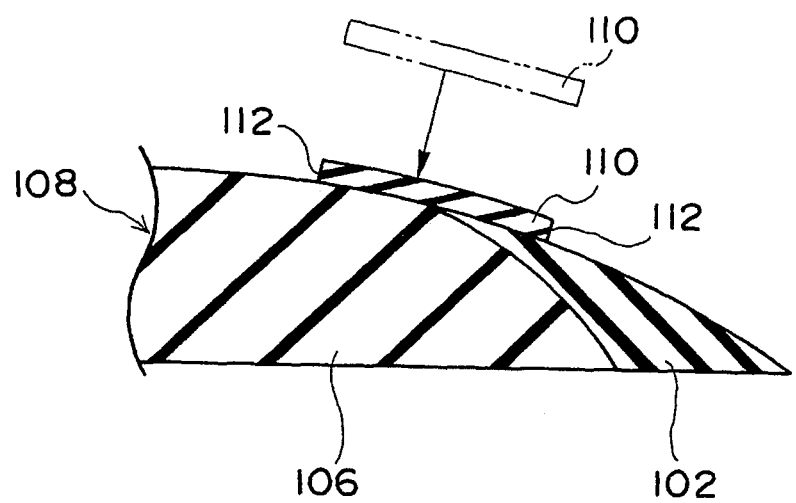
FIG. 12 is a cross-sectional view of a conventional unvulcanized rubber member.

As shown in FIGS. 4, 5, 6, the flow path 34a has at the upper side (the arrow U direction side) of the upstream side (the extrusion head side), a first inclined surface 36 and a second inclined surface 38. A dam 40 is provided at the lower side (the arrow D direction side) of the upstream side, so as to oppose the first inclined surface 36. Note that a first reversely inclined surface 42 is formed at the downstream side of the dam 40. Further, at the main rubber flow path 34, a fourth inclined surface 46, a second reversely inclined surface 48, a third reversely inclined surface 50 and a fourth reversely inclined surface 52 are formed at the left side in the drawing of the second inclined surface 38.

As shown in FIGS. 4, 5, at the flow path forming mold 32, at the upstream side, one end of an auxiliary rubber flow path 44 is open further upward than the opening of the main rubber flow path 34. The other end of the auxiliary rubber flow path 44 opens at a parallel wall portion 54 that is positioned at the cap side of the second inclined surface 38 and the fourth inclined surface 46. The unvulcanized rubber B, that is made to flow-in from the one end, is made to flow in a perpendicular direction as shown by arrow B with respect to the side surface of the unvulcanized rubber A that flows through the interior of the flow path 34a in the arrow A direction. Note that, in FIG. 4, the unvulcanized rubbers A, B, C flow through the main rubber flow path 34 from the front side of the drawing toward the reverse surface side.

Further, as shown in FIGS. 4, 6-10, at the main rubber flow path 34, at the lower side (the arrow D direction side), a parallel wall 56 is formed from the dam 40 toward the arrow L direction side, and a fifth reversely inclined surface 58, a fifth inclined surface 60, a sixth inclined surface 62, and a seventh inclined surface 64 are formed so as to be spaced apart by an interval from the dam 40.

Next, operation of the unvulcanized rubber extruder 10 will be described. First, the unvulcanized rubbers A, B, C are fed-out by the respective extruder main bodies 12, 14, 16 toward the extrusion head 18, and the unvulcanized rubber A flows-into the flow path 34a via the flow path 22a, the unvulcanized rubber B flows-into the flow path 34b via the flow path 22b, and the unvulcanized rubber C flows-into the flow path 34c via the flow path 22c. Further, a portion of the unvulcanized rubber B flows-into the auxiliary rubber flow path 44.

Therefore, the unvulcanized rubber A is, at the arrow R direction side, and the unvulcanized rubber C is, at the arrow L direction side, and the unvulcanized rubber B is, at the central portion, extruded via the cap 20.

To describe in further detail, at the main rubber flow path 34, the unvulcanized rubber A flows toward the cap side mainly along the first inclined surface 36, the second inclined surface 38 and the first reversely inclined surface 42, and forms the rubber chafer portion.

The unvulcanized rubber B flows toward the cap side (from the front side of the sheet surface toward the reverse side in FIG. 4, the arrow A direction in FIG. 5) along the second inclined surface 38, the fourth inclined surface 46, the parallel wall portion 54, the second reversely inclined surface 48, the third reversely inclined surface 50, the parallel wall 56 and the fifth reversely inclined surface 58 of the main rubber flow path 34, and forms the sidewall rubber layer portion.

As shown in FIG. 4, in a vicinity of the left side end portion in the drawing of the unvulcanized rubber A (rubber chafer portion), at the lower side of the main rubber flow path 34, the unvulcanized rubber B flows along the parallel wall 56, and, at the upper side of the main rubber flow path 34, flows along the second inclined surface 38, and a portion of the unvulcanized rubber B is extruded in a perpendicular direction (the arrow B direction) from the auxiliary rubber flow path 44 with respect to the main flow shown by the arrow A direction in FIG. 5.

Therefore, the left side end portion in the drawing of the unvulcanized rubber A (rubber chafer portion) is in a form in which the upper side and the lower side are sandwiched by the flows of the unvulcanized rubber B as shown in FIG. 4. Note that the thickness of the unvulcanized rubber B, that covers the upper side portion of the left side end portion in the drawing of the unvulcanized rubber A, can be adjusted by the diameter, the position of the opening, the shape of the opening of the auxiliary rubber flow path 44.

Here, if the auxiliary rubber flow path 44, that can extrude a portion of the unvulcanized rubber B in a perpendicular direction with respect to the main flow shown by the arrow A direction, is not provided, the upper side portion of the left side end portion in the drawing of the unvulcanized rubber A cannot be covered by the unvulcanized rubber B.

Note that the unvulcanized rubber C flows toward the cap side along the fifth inclined surface 60, the sixth inclined surface 62, the seventh inclined surface 64 and the fourth reversely inclined surface 52, and forms the cushion rubber layer portion.

In this way, by using the unvulcanized rubber extruder 10 of the present exemplary embodiment, the unvulcanized rubber member 19, that is formed from three types of unvulcanized rubbers as shown in the cross-sectional view of FIG. 2, can be molded in one step.

Further, at the unvulcanized rubber member 19, because there are no surface steps due to the affixing of a rubber sheet as in the conventional example, there is no fear of generating bare portions.

[Another Exemplary Embodiment]

The above-described exemplary embodiment has shown an example of forming the unvulcanized rubber member 19 that uses the unvulcanized rubber C. However, the unvulcanized rubber member 19 may be only the unvulcanized rubber A for forming the rubber chafer and the unvulcanized rubber B for forming the sidewall rubber layer.

In the above-described exemplary embodiment, the unvulcanized rubber B is made to flow-out from the other end of the auxiliary rubber flow path 44 in a perpendicular direction as shown by arrow B with respect to the side surface of the unvulcanized rubber A that flows in the arrow A direction through the interior of the flow path 34a. However, it suffices to at least make the unvulcanized rubber B flow-out from the side wall of the flow path 34a, and the flow-out direction of the unvulcanized rubber B may be an angle other than a right angle with respect to the side surface of the unvulcanized rubber A that flows in the arrow A direction through the interior of the flow path 34a.

The invention claimed is:

1. An unvulcanized rubber extruder having a first extruder main body that extrudes a first unvulcanized rubber, a second extruder main body that extrudes a second unvulcanized rubber, an extrusion head that connects a distal end portion of the first extruder main body and a distal end of the second extruder main body, and a flow path forming mold that leads the first unvulcanized rubber and the second unvulcanized rubber out toward a cap at an extrusion head distal end portion, the unvulcanized rubber extruder extrusion-molding an extruded rubber member having a cross-sectional shape in which, when viewed in a cross-section perpendicular to an extruding direction of the extruded rubber member, a portion of the second unvulcanized rubber penetrates into the first unvulcanized rubber, and a portion of the first unvulcanized rubber is disposed at both sides in a direction intersecting a penetrating direction that the second unvulcanized rubber has penetrated, wherein the flow path forming mold has a first flow path that passes the first unvulcanized rubber toward the cap; a second flow path that is provided parallel to the first flow path and passes the second unvulcanized rubber toward the cap, the second flow path includes a first inclined surface and a second incline surface on an upper side, the second inclined surface is located between the first flow path and the first inclined surface and is lower than the first inclined surface at the second flow path; and a third flow path that opens at a side wall of the second flow path and causes the first unvulcanized rubber to flow-out toward a side surface in a horizontal direction of the second unvulcanized rubber flowing along a side of the second inclined surface, and the unvulcanized rubber extruder connects the first unvulcanized rubber, that has flowed-out from the third flow path, to a portion of the first vulcanized rubber that flows through the first flow path, and sandwiches-in a portion of the second unvulcanized rubber by a portion of the first unvulcanized rubber that flows through the first flow path and the first unvulcanized rubber that has flowed-out from the third flow path.

2. The unvulcanized rubber extruder of claim 1, wherein the third flow path causes the first unvulcanized rubber to flow-out in a direction perpendicular to the second flow path.

* * * * *